United States Patent [19]

Finn et al.

[11] Patent Number: 4,540,197
[45] Date of Patent: Sep. 10, 1985

[54] VEHICLE WHEEL SUSPENSION

[75] Inventors: Bernard J. Finn, Troy; Ming-Chih Yew, Rochester, both of Mich.

[73] Assignee: General Motors Corporation, Detroit, Mich.

[21] Appl. No.: 516,034

[22] Filed: Jul. 22, 1983

Related U.S. Application Data

[63] Continuation-in-part of Ser. No. 332,766, Dec. 21, 1981, abandoned.

[51] Int. Cl.³ .............................................. B60G 3/00
[52] U.S. Cl. ..................................... 280/697; 267/25; 280/689
[58] Field of Search ............... 280/664, 665, 669, 689, 280/690, 692, 694, 695, 697, 699, 700, 715, 719, 720, 721; 267/57, 57.1 A, 25

[56] References Cited

U.S. PATENT DOCUMENTS

| 3,701,542 | 10/1972 | Grosseau | 280/721 |
| 3,831,966 | 8/1974 | Grosseau | 280/689 |
| 4,243,247 | 1/1981 | Kataoka | 280/700 |
| 4,272,101 | 6/1981 | Chambon | 280/692 |

FOREIGN PATENT DOCUMENTS

| 1805219 | 5/1969 | Fed. Rep. of Germany | 280/669 |
| 1296534 | 5/1969 | Fed. Rep. of Germany | 280/669 |

Primary Examiner—Joseph F. Peters, Jr.
Assistant Examiner—Ross Weaver
Attorney, Agent, or Firm—Saul Schwartz

[57] ABSTRACT

A vehicle wheel suspension includes transverse control arms for an opposed pair of road wheels and a primary suspension spring beam spaced longitudinally of the vehicle away from the control arms and interconnected therewith by torsion rods installed on axes located outboard of the swing axes of the transverse control arms.

4 Claims, 10 Drawing Figures

VEHICLE WHEEL SUSPENSION

This application is a Continuation-In-Part of U.S patent application Ser. No. 332,766 filed Dec. 21, 1981, now abandoned.

This invention relates to vehicle wheel suspensions and more particularly to such suspensions employing transversely oriented primary suspension spring beams.

The installation of a total drive aggregate in either a front or rear compartment of the modern vehicle, combined with the general trend toward reduction of volume and mass in those areas of the vehicle body, imposes substantial design limitations in the use of conventional chassis systems, particularly vehicle suspension elements. Space and structure formerly available for locating such items as suspension control arms, vertical shock struts, coil springs and the like is needed for drive train components. Moreover, modern combined spring and shock strut suspensions of the so-called MacPherson type provide no completely satisfactory answer since they dictate high hood and quarter profiles resulting from the vertical stacking of the suspension elements typical in those arrangements.

The present invention provides vehicle wheel suspension affording greater latitude to the vehicle designer in both space utilization and body styling. It includes a pair of transversely oriented control arms for the opposed road wheels and adapted to swing about longitudinal axes of the sprung mass in conventional manner. However, rather than connecting with such control arms a primary suspension coil or like spring at each side in the vicinity of each road wheel, such primary suspension spring rather is comprised of a transverse elastic beam spaced longitudinally from the control arms and which may be in an area of the vehicle not required for other components. Substantial space is thus freed laterally between the control arms such as for drive aggregate, as well as the space near and above the road wheels normally consumed by compressible coil springs on MacPherson struts or otherwise.

Such a longitudinally spaced transverse primary suspension spring has been proposed on paper in the past but appears commercially unsatisfactory. Thus, Grosseau U.S. Pat. Nos. 3,701,542 and 3,831,966 show a suspension arrangement including a transverse primary spring beam, conventional quadrilateral suspension linkage, and torsion bars extending from the lower quadrilateral arms along their pivot axes to connect such control arms with the ends of the suspension spring. Such an arrangement necessitates that the bending modes of the transverse spring caused by normal vehicle ride and handling deflections of the road wheels can be accommodated only by specially proposed connecting systems between the ends of the transverse spring and the two torsion bars. Such proposals form the subject of the patents and are clearly unsatisfactory from several functional and structural standpoints.

By the present invention a commercially superior arrangement of a transverse spring suspension is provided. It has been found in the course of developing our invention that reinforced polymeric material such as fiberglass filled polyester resin or the like exhibits superior properties for use in a spring beam. The present arrangement of the transverse spring beam makes effective use of a beam made of such material not only as the primary suspension spring but also as the principal or only anti-roll element for control of vehicle handling characteristics. We provide a practical arrangement which not only avoids elaborate prior art interconnection devices between the deflecting wheel control arms and the suspension beam but also eliminating functional deficiencies of the prior art.

Thus, the invention features the use of interconnection elements, such as torsion bars, which are simply fixed each at one end to a control arm and aligned along longitudinal axes of the chassis spaced outboard of the control arm pivot axes, and then simply fixed at their other ends to the transverse beam terminal ends in such fashion that control arm deflections cause the transverse beam to experience bending modes which are characterized by an inboard pair of nodal points within the beam at fixed locations of the sprung mass. This nodal point bending characteristic at once affords and is the result of the simple connections just described. With the Grosseau structures, the interconnections at the ends of the transverse beam, while elaborate, still experience gross amounts of relative sliding motion between the beam ends and the interconnecting element as beam deflection occurs. With the instant invention, the nodal point bending characteristic enables geometry wherein no appreciable such relative displacement will occur. And, should long rods be chosen as an interconnecting element, as is true in one of the instant preferred embodiments, then further advantage is derived from the fact that no longitudinal bending of the torsion rod occurs and there need be no independent structural support of such rod on the chassis sprung mass as required in the prior art. Alternatively, should beam support locations be lacking in a particular vehicle body style, reaction mounts can be disposed between the control arms and the torsion rods to eliminate the necessity of separately mounting the elastic beam on the sprung mass.

More specifically, the nodal point beam bending characteristic of the present invention contemplates that the spacing between the control arm axis and the torsion rod axis may be so selected with reference to the material properties of the beam and the torsion rod, if such be used, that both the beam end and the control arm anchorages of the torsion rod ends describe generally identical arcuate paths in parallel planes in space during wheel deflections. The torsion rod, or other interconnecting device, acts to simply carry a pure force couple between the control arm and the respective beam end. To complete the system, reaction load elements are provided on the chassis sprung mass at the nodal points of the beam or on the control arms between the ends of the torsion rods to serve as spring constraints during vehicle roll. The entire such system enables use of the lightweight polymeric spring above referred to as the sole or principal ride and anti-roll rate control element, and without any undue sacrifice in one function to favor the other. We expect further advantage herein in that by judicious design of such nodal point reaction elements, even expanded latitude will be afforded the designer in selection of the ride and the anti-roll behavior of the spring beam and thus of the vehicle.

Employing all of the aforementioned realized objectives and features of this invention results in a suspension package of light weight, high space utilization efficiency and simplicity of construction. The spring beam is even easily contained within a relatively shallow box section cross member of the vehicle where the spring is at a low position giving space for engine aggregates yet is protected from road hazards. The suspension may additionally feature design height adjustment provisions wherein the torsion rods of the exemplary embodiments are connected to the respective control arms via adjustable lever arm devices suitable to variable prestressing of the torsion rod and spring beam to support the vehicle mass at variable design heights.

The foregoing objects, features and advantages of the invention will be readily apparent from the following specification and from the drawings wherein.

Figure 1:
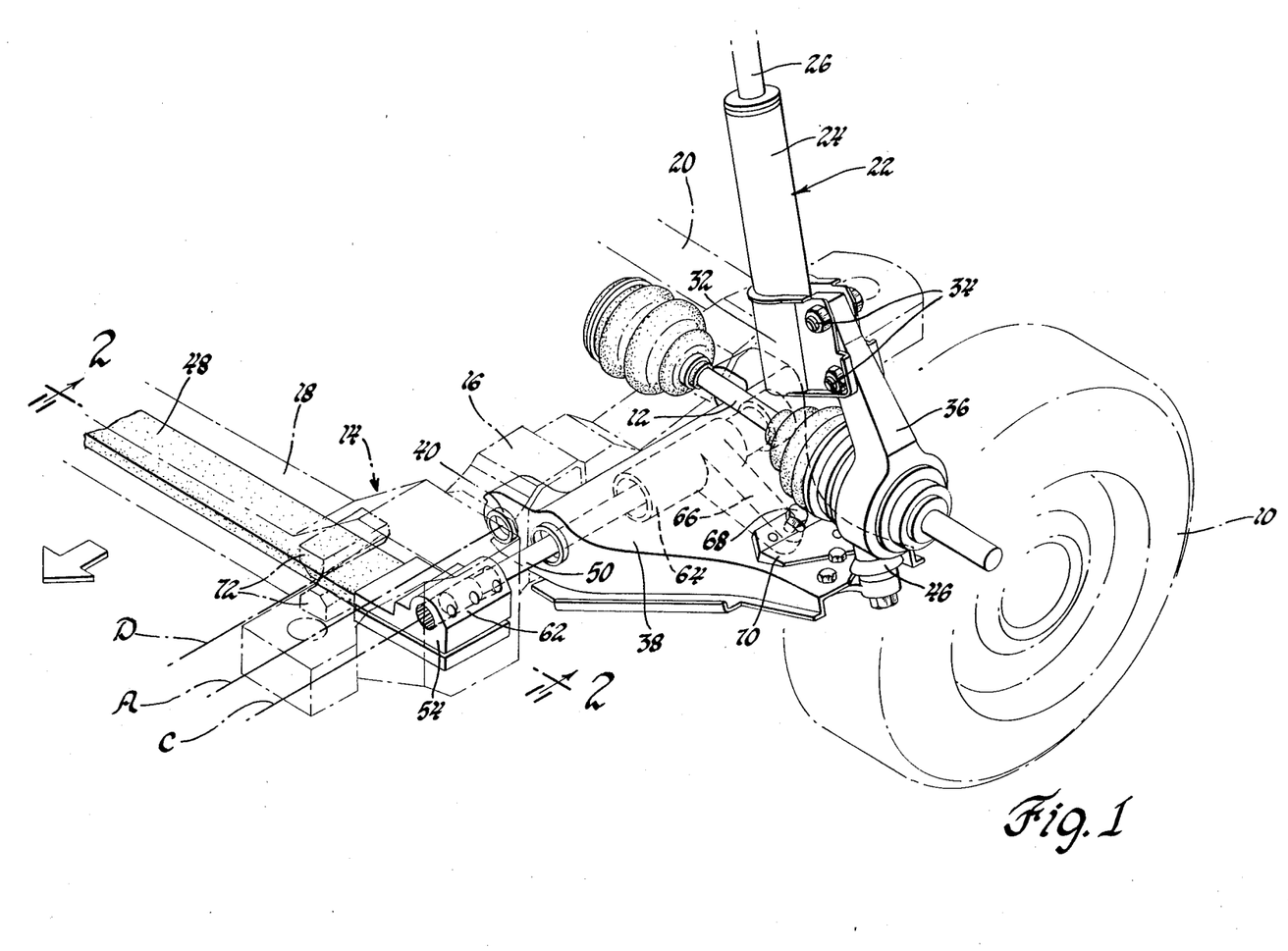
FIG. 1 is a fragmentary, perspective view, partially in phantom, of a vehicle chassis sprung mass and wheel suspension therefor in accordance with the invention.

Referring particularly now to FIG. 1 of the drawings, the same illustrates the front portion of an automotive vehicle chassis and front suspension, in accordance with this invention, for the steerable front road wheels as indicated in phantom at 10. Such road wheel is adapted for connection via a drive shaft assembly 12 to a front drive aggregate which may be located in the front compartment of the vehicle body or sprung mass, all as well known in the art. The present invention is directed to the packaging and body styling challenges arising with such front-drive design but it should be noted that this invention is equally well adapted to vehicles with rear drive aggregates or otherwise where space utilization efficiency is a problem.

In the front drive vehicle shown, the vehicle sprung mass or chassis/body may comprise a drive aggregate cradle 14 including a preassembled combination of stamped sheet metal welded box section rails 16 and fore and aft spaced box section cross members only generally indicated at 18 and 20. Such cradle assemblies support the vehicle drive aggregate, not shown, and are conventionally bolted to the remainder of the vehicle body via isolation mounts.

A vehicle wheel suspension in accordance with this invention is, in the instant preferred embodiment, structured to include members presently found in vertical strut/shock suspensions but it should be understood that the principles of the invention are not thus limited. A vertical strut/shock 22 comprises an outer shock cylinder 24 and a telescoping piston rod 26 suitably anchored to an upper sheet metal tower structure 28 of the vehicle body sprung mass, as via a conventional isolation coupling indicated at 30 in FIG. 2. As well known, such strut/shock 22 may further include a saddle bracket 32 welded or otherwise fixed to cylinder 24 and including ears for reception of a spaced pair of through-bolt and nut assemblies 34 which attach the strut/shock 22 to an upper portion of the usual wheel support or knuckle 36. As is known, such knuckle, in the case of driven or live axle road wheels, includes provision for passage of the drive shaft 12 through the knuckle as a live spindle as here shown. The space utilization advantages of the invention, while generally directed to the problems of drive aggregate packaging, may equally apply to dead spindle suspensions remote from the drive aggregate, or to older forms of propeller shaft rear drive vehicles.

The suspension of this invention includes for wheel 10 a transverse control arm 38 swingably mounted on and defining part of the vehicle chassis sprung mass, as at rail 16. The control arm is thus mounted to swing on an axis A, at the center of an aligned pair of pivot assemblies which may be conventionally structured of rubber bushed sleeves 40 seated in spaced legs of the control arm and affixed to brackets 42 of the rail 16 via bolt/nut fasteners 44, FIGS. 3 and 4. At the outboard end of such control arm 38 there is provided a conventional ball joint 46 installed within a lower portion of knuckle 36. As is known, such ball joint cooperates with strut/shock 22 to define a steer axis for steerable road wheel 10 under actuation of conventional steering linkage, not shown.

Referring again to FIG. 1, in accordance with the principles of the invention, there is provided a transverse spring beam 48. The spring is contained within the confines of the front box section cross member 20 and extends completely therethrough to have symmetry about the vehicle centerline and identical connection with the opposite steerable road wheel 10 in the same manner as to that now to be described for the road wheel 10 shown. Thus, the descriptions given above and hereinafter to the structure illustrated are identically applicable to the other mirror half of the instant suspension embodiment. As to beam 48, while the invention is in no way limited to a selection of spring material it has nevertheless been found that the invention is best embodied with a beam constructed of reinforced polymeric material such as a fiberglass reinforced polyester resin. Such a spring beam achieves light weight while still absorbing high amounts of strain energy, and exhibits a modulus of elasticity well adapted to use for both ride and vehicle roll rate control as applied in the manner now to be described.

Figure 2:
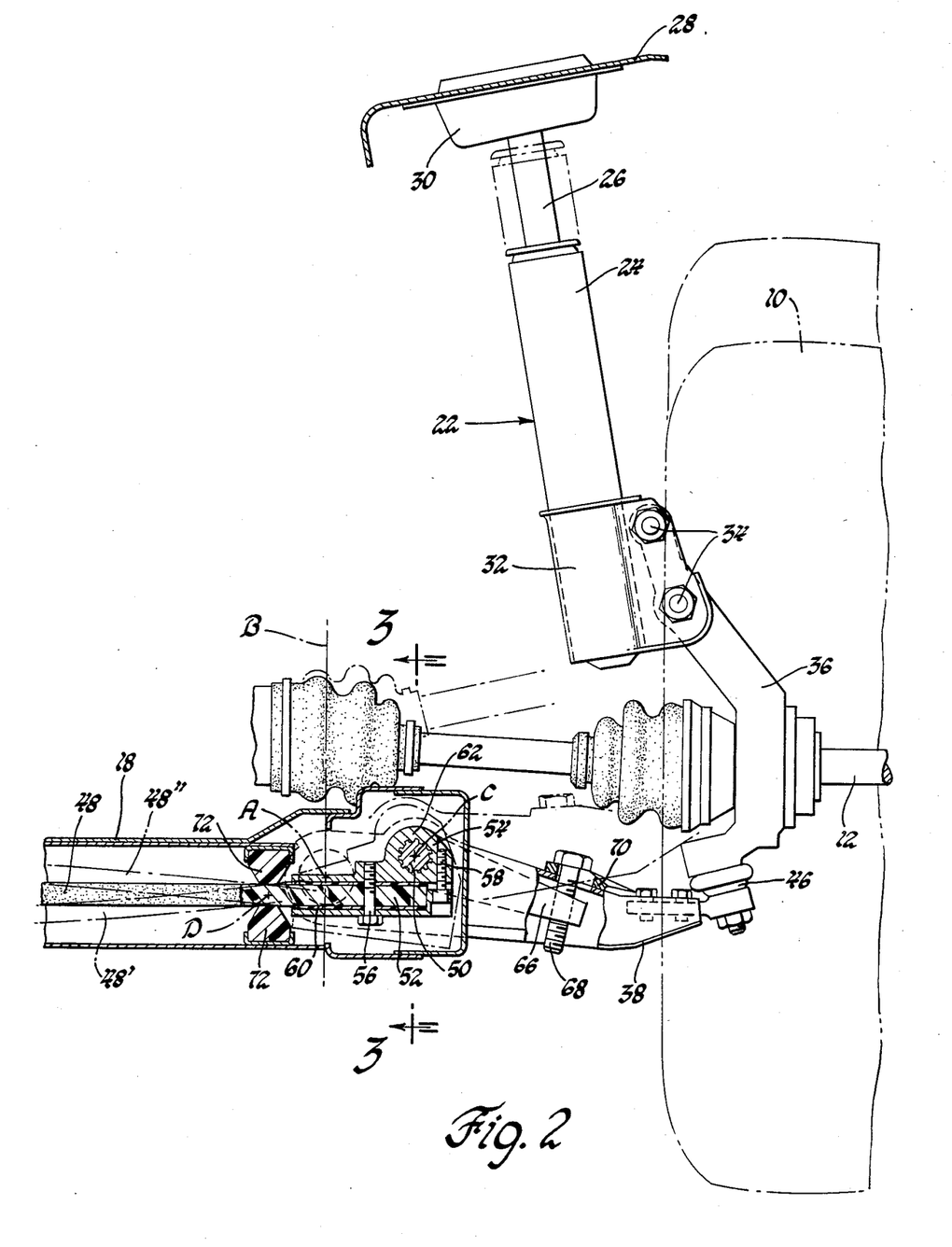
FIG. 2 is an enlarged elevational view, partially in section, taken generally along the plane indicated by lines 2—2 of FIG. 1 and indicating the wheel suspension in a plurality of wheel positions.
Figure 3:
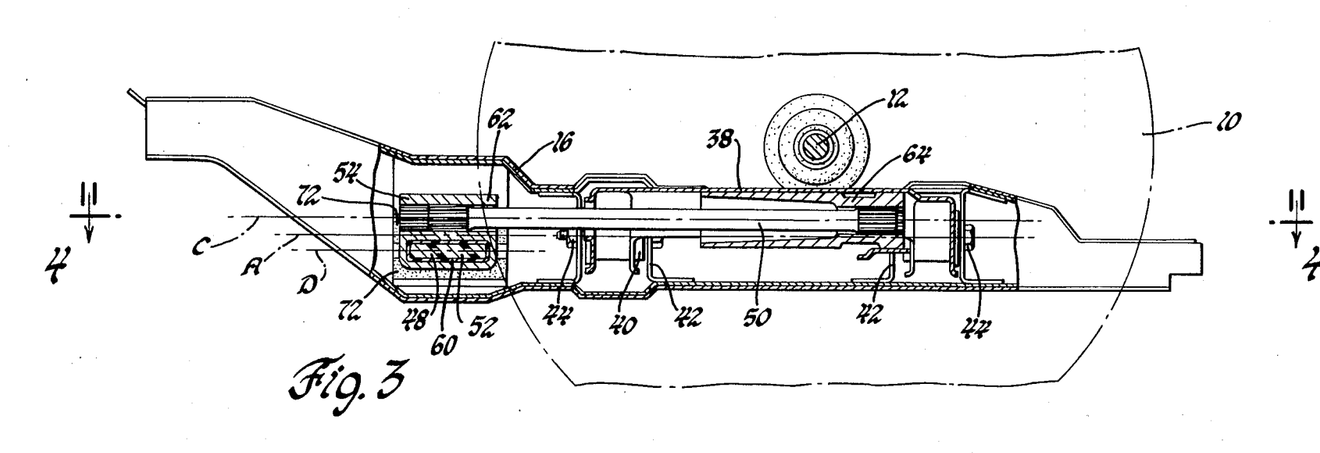
FIG. 3 is a reduced sectional view taken generally along the plane indicated by lines 3—3 of FIG. 2.
Figure 4:
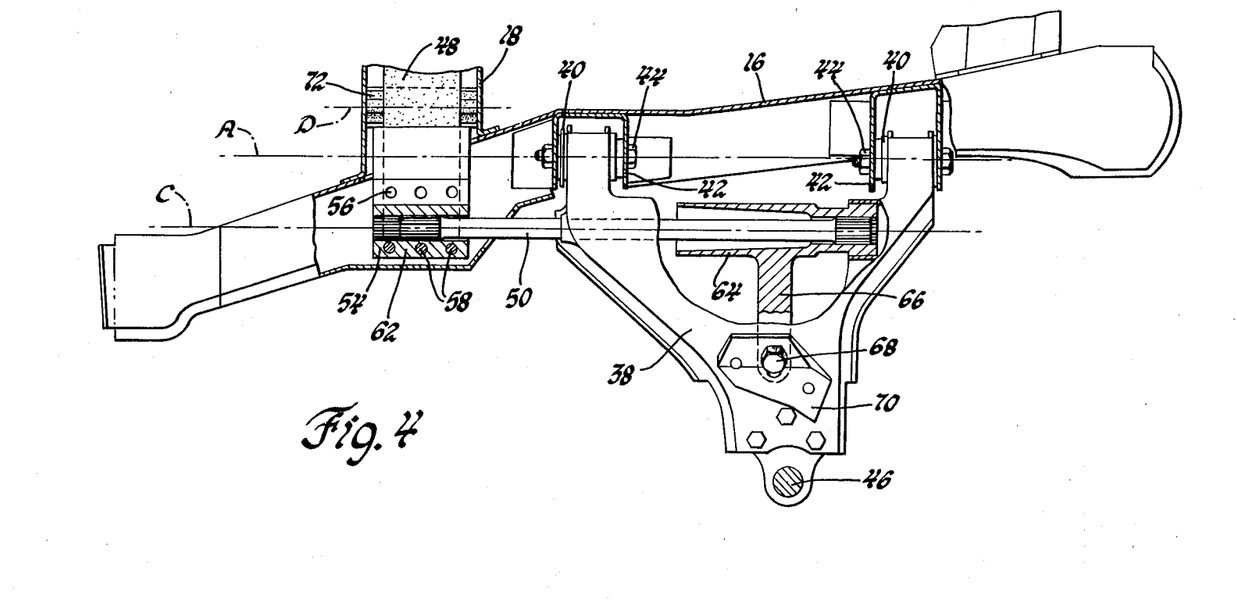
FIG. 4 is a similar view taken generally along the plane indicated by lines 4—4 of FIG. 3.

As seen in FIGS. 2 through 4, the spring beam 48, in accordance with this invention, is arranged to have its terminal ends extend substantially laterally beyond vertical planes B containing the swing axes A of the opposite control arms 38. In the instant embodiment, control arms 38 are connected to those extended ends of spring beam 48 by a pair of torsion rods 50. The torsion rods each lie along an axis C, FIGS. 3 and 4, which lie outboard of the swing axes A of the control arms. Each terminal end of the spring beam 48, indicated by the numeral 52, carries a clamp assembly 54 comprised of mated upper and lower sections enveloping the end of the beam and joined by fasteners 56 extending through apertures in the beam end 52, and further fasteners 58. A rubber or like material isolation sleeve 60 intervenes beam end 52 and the clamp assembly. The upper part of the clamp assembly includes a boss 62 suitably apertured and provided therein with internal splines mated with external splines on the forward ends of torsion rods 50, thereby to establish torque-carrying connection of each torsion rod to the spring beam 48 at axis C.

Figure 5:
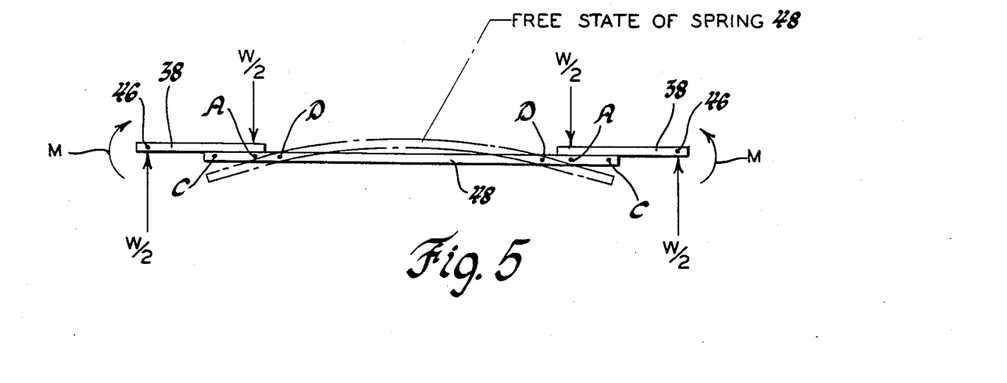
FIGS. 5 through 7 are diagrammatic representations of various bending modes of the spring beam of the suspension.

At its other end, the torsion rod carries similar external splines and is received within a design height adjustment device for control arm 38. Such device comprises an elongated tubular lever member 64 having its rearward end rotatably carried within a pocket of the control arm as shown in FIGS. 3 and 4. The lever member has an arm or crank portion 66 extending transversely toward the ball joint 46. As seen best in FIG. 2, the end of such crank portion is apertured and threaded to receive the threaded shank of a design height adjusting stud 68 which projects through an aperture of the control arm 38 and rests upon a beveled bolt head seat 70 fixed thereon. Thus, the torsion rods 50 are placed in torque-carrying relationship between the control arms, which swing about axes A, and the elastic spring beam 48. As seen in FIG. 5, with the front end weight of the vehicle sprung mass imposed in shares W/2 upon the bushings 40 at each axis A, the ground reaction W/2 on each road wheel 10 creates a force couple M within each control arm 38 representative of vehicle weight only, and tending toward counterclockwise rotation of the control arm viewed in FIG. 2. Such force couple M is carried via the torsion rods 50 at axes C to the beam ends 52 thereby to cause the beam 48 to be stressed and deflected in accordance with its modulus of elasticity and torsion rods 50 are torsionally deflected in accordance with their elasticity. The result is a specific angular position of control arm 38 defining a so-called "design height" for a particular sprung mass at so-called "design loading", e.g., 2 passengers and a quantity of cargo. The lever member 64 provides a convenient adjustment of the position of each control arm 38 about swing axis A in the presence of such deflections under the weight of that particular sprung mass. The design height of the latter is simply adjusted by threaded rotation of stud 68 to vary the angular relationship of the control arm, and thus the sprung mass, in relation to the crank portion 66 of the loaded torsion rod 50.

Figure 6:
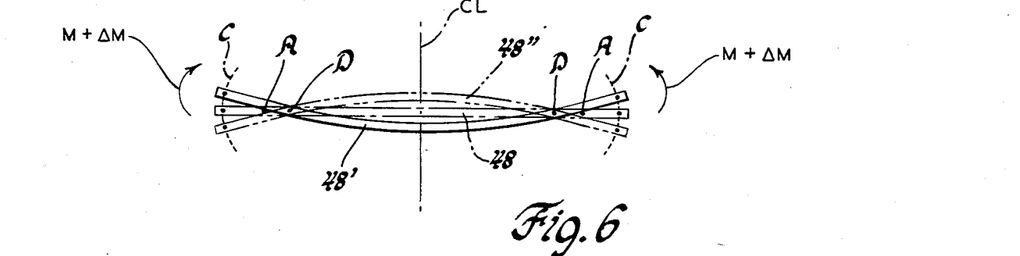
Figure 7:
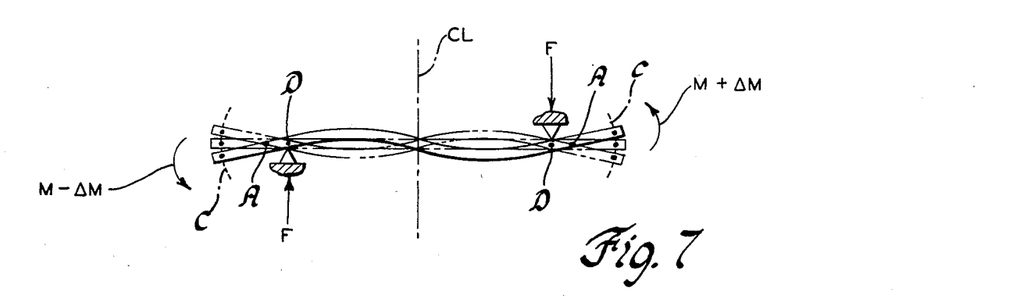

The result of the interassociation of parts thus far described is to cause spring beam 48 to have defined therein a spaced pair of neutral or nodal deflection points as at axis D, FIGS. 1, 2 and 4. The locations of the nodal points are symmetrical with respect to the center line of the vehicle and depend primarily upon the length of the beam 48 where the beam is of constant section modulus across its entire length. In beams of constant length, the location of the nodal points with respect to the center line of the vehicle may be altered by varying the section modulus along the length of the beam. Thus, as viewed in FIG. 2, dynamic road forces causing deflection of road wheel 10 in an upward direction to the broken line position shown, causes the torsion rod to impose an increased force couple at terminal beam end 52 in such a manner as to bend the spring beam to a condition such as indicated at 48'. This bending occurs with the beam remaining essentially vibratorily undisturbed in space or relative to the sprung mass cross member 20 at the location of nodal axes D. Such is also true for an opposite deflection of the road wheel 10 and deflection of spring beam 48 to a position as indicated at 48" in FIG. 2. This beam bending nodal point characteristic is true whether the opposite front road wheels 10 are deflected in the same direction, as during pure ride motion, or during a turning maneuver where a roll couple imposes forces producing opposite wheel deflections across the car. As seen in FIG. 6, in the former case of pure ride motion, the beam is in "pure bending" as the term is known, i.e. equal force couples $\Delta M$ alone acting counter-rotatively on the beam ends, and with no vertical reaction forces required to hold the beam fixed in space or relative the sprung mass. As seen in FIG. 7, during roll motion the opposite control arms deflect asymmetrically and beam bending is converted to some higher order sinuous curvature to accommodate within the beam the situation where the force couples are of the same sense tending to displace the beam bodily in space relative the sprung mass. In such case vertical reaction forces F are required in space and the same are provided by appropriate reaction mounts, to be described, located at the spaced pair of nodal points at axes D. A variety of dynamic road force conditions may of course be induced in the suspension combining some part of each of the two theoretically pure cases shown in FIGS. 6 and 7, but the beam 48 is expected to bend about its characteristic nodal points at axes D in any case.

It is a feature of such beam bending characteristic in any of these cases that all such bending may proceed with no significant relative motion between the beam ends 52 and the respective control arm 38 at either side of the vehicle. Thus, as viewed in FIG. 2, the point on control arm 38 in some transverse vertical plane through which torsion rod 50 projects can describe virtually the same arc of travel as will the point on the beam end 52 of the spring beam in a parallel transverse vertical plane through which the other end of torsion rod 50 projects. These are identified by the single arc C at each beam end appearing in FIGS. 6 and 7. The curved paths of the beam ends 52 are essentially described around the nodal axes D, while the circular arcs of travel of the rearward ends of the torsion rods 50 are of course described about axes A of the bushings 40. Some minute difference in curvature may exist, but by appropriate selection of the elasticity of the torsion rods and of spring beam 48, these paths in the two spaced transverse planes may be essentially such that there need be no bending forces of any importance longitudinally along axes C in the torsion rods 50. Such torsion rods thus simply carry the pure force couples associated with deflections of road wheels 10 about axes A. There need be no independent support of the torsion rods on the sprung mass. And the location of torsion rods 50 away from axes A inherently simplifies the construction of control arms 38 and the bushings 40 over prior practice, where torsion rods are placed directly on such axes A and the control arm pivots must accordingly be specially modified.

As seen best in FIG. 2, the reaction mounts at axes D for the system are indicated at 72 and each simply comprises an opposed pair of rubber or like material tapered blocks lightly force fitted between interior surfaces of cross member 18 and beam 48. The hardness of the rubber is selected to best achieve isolation of road disturbances from the vehicle sprung mass without significantly softening within the free-body force situations represented in FIG. 7, the vertical restraint of nodal axes D under forces F. It is expected, however, that the shape of the blocks, or the material softness thereof, or some appropriate combination of selections thereof may very well prove to impart further advantage to the instant invention in allowing yet another area of design flexibility wherein the roll rate of the suspension, for example, might be readily adjusted without affecting ride rate, simply by alterations in the behavior of spring beam 48 at its nodal points.

Of course, due to the lateral spacing between rotational axes, so to speak, of the terminal beam ends 52 at D and the control arms at A, there is a consequent mismatch of the angular deflection which the two ends of torsion rod 50 undergo during wheel deflection. Such mismatch induces torsional deflection in such rods 50 during the wheel deflection and gives rise to the consideration of the material of the torsion rod, also for appropriate design of the ride and roll characteristic of the suspension system. As indicated hereinabove, the invention is not limited to the use of actual such torsion rods inasmuch as other means, such as longitudinal extensions of stamped metal from control arms 38, for example, may provide acceptable results. A variety of concerns such as cost, weight, the desired location of the transverse spring beam longitudinally apart from the control arms for efficient space utilization, etc. will all enter in making such choices. It is manifest, that the principles of the invention give rise to a number of such possibilities enabling practical suspension constructions of the instant general type not heretofore available.

Figure 8:
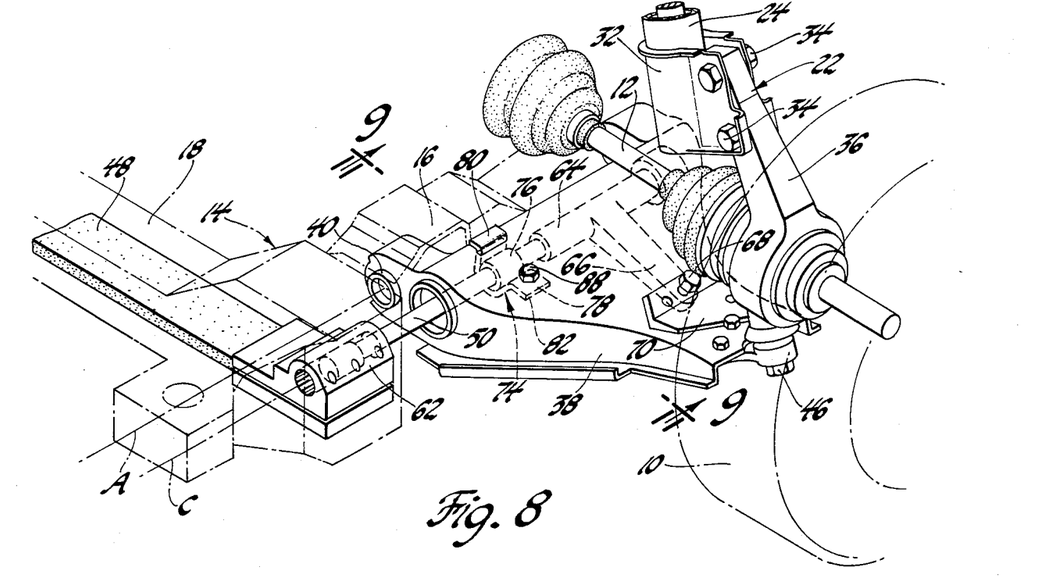
FIG. 8 is similar to FIG. 1 but showing another embodiment of the vehicle wheel suspension in accordance with this invention.
Figures 9, 10:
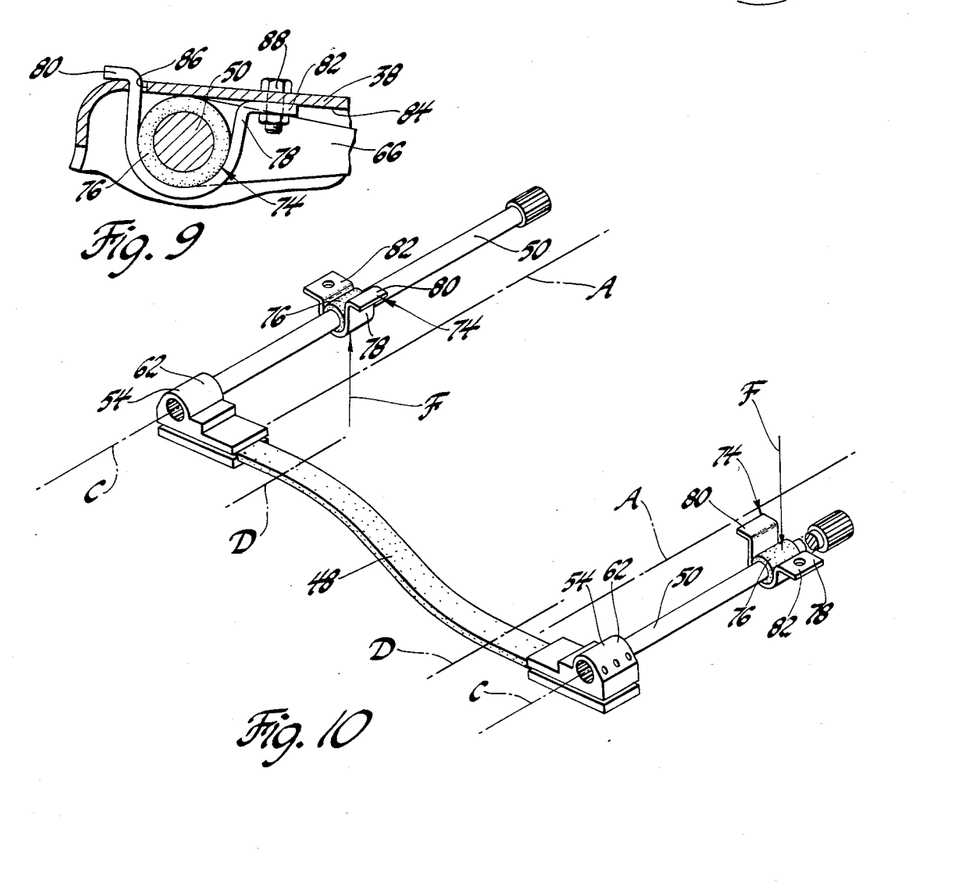
FIG. 9 is a sectional view taken generally along the plane indicated by lines 9—9 in FIG. 8.
FIG. 10 is a perspective view showing the elastic beam, torsion rods, and reaction mounts of the embodiment of FIG. 8.

Referring now to FIGS. 8, 9 and 10 and describing another embodiment of the wheel suspension system according to this invention where structure common to the first embodiment is identified as before, the reaction mounts 72 of the first embodiment are eliminated and replaced by a pair of reaction mounts 74 between the control arms 38 and respective ones of the torsion rods 50. Each reaction mount 74 includes a cylindrical bearing element 76 received around the torsion rod 50 and within which the rod is free to rotate about axis C. While the bearing elements 76 are shown as complete cylinders, they may be fabricated in halves in known fashion. Each reaction mount 74 further includes a strap 78 having a lip 80, a flange 82, and an intermediate portion therebetween curved to match the outside diameter of the bearing element 76. With the torsion rod 50 disposed between the clamp assembly 54 and the lever member 64 as described hereinbefore, the bearing element 76 is located below an underside surface 84, FIG. 9, of the control arm 38. The lip 80 on the strap 78 projects through an appropriate aperture 86 in the control arm and hooks on the latter while a nut and bolt fastener 88 rigidly attaches the flange 82 to the control arm. Accordingly, the torsion rods 50 are rotatably supported intermediate their ends on respective ones of the control arms.

In operation, the elastic beam 48 of the embodiment shown in FIGS. 8, 9 and 10 functions as described hereinbefore during symmetric deflection of the control arms 38. That is, the elastic beam oscillates in pure bending about nodal points D between the positions identified at 48' and 48" in FIG. 6. In pure bending no vertical reaction forces are needed to maintain the elastic beam 48 in equilibrium so that no such forces are developed at the bearing elements 76. During asymmetric deflection of the control arms 38, however, as when the vehicle experiences body roll during a turn, vertical forces F are developed at the reaction mounts 74 to maintain equilibrium at the elastic beam 48. The vertical forces F are transmitted from the control arms 38 to the torsion rods 50 through the bearing elements 76 so that the torsion rods operate both in torsional and bending modes. Accordingly, both the material characteristics and the physical dimensions of the torsion rods must be coordinated with the overall ride objective of the suspension system.

The embodiments of the invention in which an exclusive property or privilege is claimed are defined as follows:

1. Wheel suspension for the sprung mass of a vehicle which includes a transversely opposite pair of road wheels, comprising, a pair of transverse control arms each carrying one of said wheels and swingably mounted at one side of the sprung mass on a generally longitudinally extending axis thereof, a primary suspension spring comprising an elastic beam extending transversely of the sprung mass proximate said control arms but spaced longitudinally of the sprung mass therefrom and having end portions projecting outboard of generally vertical planes containing the swing axes of said control arms, a pair of torsion rods extending on axes generally parallel but outboard said control arms swing axes and each connected at one end to a respective control arm and affixed at the other to an end of said beam, said rods being operative to carry to said beam forces deflecting said control arms relative the sprung mass, whereby the beam is adapted to bend under such forces about a spaced pair of nodal points located substantially inboard of said interconnection locations, and reaction mount means between each of the torsion rods and respective ones of the control arms operative to exert on the torsion rods intermediate their ends reaction forces counter to force couples developed by the elastic beam during asymmetric deflection of the control arms.

2. Wheel suspension for the sprung mass of a vehicle which includes a transversely opposite pair of road wheels, comprising, a pair of transverse control arms each carrying one of said wheels and swingably mounted at one side of the sprung mass on a generally longitudinally extending axis thereof, a primary suspension spring comprising an elastic beam extending transversely of the sprung mass proximate said control arms but spaced longitudinally of the sprung mass therefrom and having end portions projecting outboard of generally vertical planes containing the swing axes of said control arms, a pair of torsion rods extending on axes generally parallel but outboard said control arms swing axes and each connected at one end to a respective control arm and affixed at the other to an end of said beam, said rods being operative to carry to said beam forces deflecting said control arms relative the sprung mass, whereby the beam is adapted to bend under such forces about a spaced pair of nodal points located substantially inboard of said interconnection locations, and reaction mount means on the sprung mass engaged with said beam at said nodal points thereof.

3. Wheel suspension for the sprung mass of a vehicle which includes a transversely opposite pair of road wheels, comprising, a pair of transverse control arms each carrying one of said wheels and swingably mounted at one side of the sprung mass on a generally longitudinally extending axis thereof, a primary suspension spring comprising an elastic beam extending transversely of the sprung mass approximate said control arms but spaced longitudinally of the sprung mass therefrom, and having end portions projecting outboard of generally vertical planes containing the swing axes of said control arms, a pair of torsion rods extending on axes generally parallel but outboard said control arm swing axes and each adapted for connection at one end to a respective control arm and affixed at the other to an end of said beam, sprung mass height adjustment means adjustably connecting said one end of each said torsion rod to a respective control arm, said rods being operative to carry to said beam forces deflecting said control arms relative the sprung mass, whereby the beam is adapted to bend under such forces about a spaced pair of nodal points located substantially inboard of said interconnection locations, and reaction mount means on the sprung mass engaged with said beam at said nodal points thereof.

4. Wheel suspension for the sprung mass of a vehicle which includes a transversely opposite pair of road wheels and a frame cross-member spaced longitudinally therefrom, comprising, a pair of transverse control arms each carrying one of said wheels and swingably mounted at one side of the sprung mass on a generally longitudinally extending axis thereof, a primary suspension spring comprising a beam of elastic polymeric material extending transversely of the sprung mass within said cross-member and having end portions projecting outboard of generally vertical planes containing the swing axes of said control arms, a pair of torsion rods extending on axes generally parallel but outboard said control arm swing axes and each connected at one end to a respective control arm and affixed at the other to an end of said beam, said rods being operative to carry to said beam forces deflecting said control arms relative the sprung mass, whereby the beam is adapted to bend under such forces about a spaced pair of nodal points located substantially inboard of said interconnection locations, and reaction mount means on the sprung mass comprising an opposed pair of elastomer blocks seated on said cross-member and engaged with said beam at said nodal points thereof.

* * * * *